United States Patent
Tanino et al.

(10) Patent No.: US 8,038,761 B2
(45) Date of Patent: Oct. 18, 2011

(54) IRON-BASED SINTERED MATERIAL AND PRODUCTION METHOD THEREOF

(75) Inventors: Hitoshi Tanino, Toyota (JP); Kimihiko Ando, Toyota (JP); Shinya Omura, Aichi (JP); Toshitake Miyake, Nagoya (JP); Mikio Kondoh, Toyoake (JP); Nobuhiko Matsumoto, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 869 days.

(21) Appl. No.: 12/076,718

(22) Filed: Mar. 21, 2008

(65) Prior Publication Data

US 2008/0233421 A1 Sep. 25, 2008

(30) Foreign Application Priority Data

Mar. 22, 2007 (JP) .................. 2007-075286

(51) Int. Cl.
*C22C 33/02* (2006.01)
(52) U.S. Cl. .......................... 75/246; 75/230
(58) Field of Classification Search .................. 75/230, 75/231, 246
See application file for complete search history.

(56) References Cited

U.S. PATENT DOCUMENTS

| | | | | |
|---|---|---|---|---|
| 4,069,044 A | * | 1/1978 | Mocarski et al. | 75/243 |
| 4,348,232 A | * | 9/1982 | Hiraoka et al. | 75/238 |
| 5,188,659 A | * | 2/1993 | Purnell | 75/246 |
| 5,872,322 A | * | 2/1999 | Mocarski et al. | 75/246 |
| 6,660,056 B2 | * | 12/2003 | Hayashi et al. | 75/243 |
| 2005/0163645 A1 | * | 7/2005 | Xu et al. | 419/28 |
| 2006/0182648 A1 | * | 8/2006 | Xu et al. | 419/38 |
| 2007/0089562 A1 | * | 4/2007 | Unami et al. | 75/255 |
| 2008/0193320 A1 | * | 8/2008 | Engquist et al. | 419/26 |

FOREIGN PATENT DOCUMENTS

| | | |
|---|---|---|
| JP | 10-140285 | 5/1998 |
| JP | 2002-020847 | 1/2002 |
| JP | 2004-143482 | 5/2004 |
| JP | 2007-23318 | 2/2007 |
| JP | 2008-013818 | 1/2008 |
| WO | WO 2005/120749 | 12/2005 |

* cited by examiner

*Primary Examiner* — Roy King
*Assistant Examiner* — Ngoclan Mai
(74) *Attorney, Agent, or Firm* — Finnegan, Henderson, Farabow, Garrett & Dunner, LLP

(57) ABSTRACT

There is provided an iron-based sintered material resistant to the metal fatigue developing from the voids therein functioning as the initial points and improved in the strength and machinability thereof. An iron-based sintered material, including a mixed structure of martensite, bainite, and pearlite and multiple voids formed in the mixed structure, wherein the ratio of martensite and bainite in the mixed structure is 70% or more; the ratio of martensite and/or bainite in the mixed structure forming the void surface is 90% or more; and the density of the iron-based sintered material is 7.4 g/cm$^3$ or more.

5 Claims, 6 Drawing Sheets

FIG. 3

| | DENSITY (g/cm³) | YOUNG'S MODULUS (GPa) | HARDNESS (Hv10) | RATIO OF MARTENSITE AND BAINITE | | FATIGUE STRENGTH RATIO |
| --- | --- | --- | --- | --- | --- | --- |
| | | | | MATERIAL (%) | VOID SURFACE (%) | |
| EXAMPLE 1-1 | 7.42 | 174 | 270 | 70 | 90 | 1.05 |
| EXAMPLE 1-2 | 7.43 | 174 | 285 | 75 | 95 | 1.07 |
| EXAMPLE 1-3 | 7.43 | 174 | 285 | 80 | 90 | 1.12 |
| EXAMPLE 1-4 | 7.47 | 182 | 294 | 82 | 90 | 1.15 |
| COMPARATIVE EXAMPLE 1-1 | 7.21 | 145 | 260 | 71 | 92 | 0.75 |
| COMPARATIVE EXAMPLE 1-2 | 7.32 | 152 | 270 | 72 | 91 | 0.85 |
| COMPARATIVE EXAMPLE 1-3 | 7.44 | 175 | 241 | 50 | 50 | 0.69 |
| COMPARATIVE EXAMPLE 1-4 | 7.42 | 173 | 256 | 49 | 90 | 0.70 |
| COMPARATIVE EXAMPLE 1-5 | 7.42 | 173 | 260 | 63 | 91 | 0.85 |
| COMPARATIVE EXAMPLE 1-6 | 7.45 | 175 | 275 | 70 | 75 | 0.92 |
| COMPARATIVE EXAMPLE 1-7 | 7.42 | 173 | 265 | 71 | 85 | 0.83 |
| REFERENCE EXAMPLE 1 | 7.85 | 207 | 275 | 0 | 0 | 1.00 |

FIG. 4

| | COMPOSITION (MASS %) | | | | | | DENSITY (g/cm³) | YOUNG'S MODULUS (GPa) | HARDNESS (Hv10) | RATIO OF MARTENSITE AND BAINITE | | FATIGUE STRENGTH RATIO |
|---|---|---|---|---|---|---|---|---|---|---|---|---|
| | C | Mo | Cu | Mn | S | P | | | | MATERIAL (%) | VOID SURFACE (%) | |
| EXAMPLE 2-1 | 0.51 | 1.52 | 1.51 | 0.50 | 0.15 | – | 7.48 | 168 | 265 | 72 | 91 | 1.01 |
| EXAMPLE 2-2 | 0.53 | 2.50 | 1.21 | 0.70 | 0.22 | – | 7.53 | 183 | 270 | 75 | 92 | 1.05 |
| EXAMPLE 2-3 | 0.62 | 1.22 | 3.01 | 0.27 | 0.15 | – | 7.55 | 185 | 275 | 70 | 90 | 1.08 |
| EXAMPLE 2-4 | 0.61 | 1.10 | 3.50 | 0.31 | 0.08 | – | 7.45 | 175 | 315 | 80 | 98 | 1.13 |
| EXAMPLE 2-5 | 0.71 | 1.65 | 1.89 | 0.26 | 0.08 | – | 7.50 | 180 | 280 | 95 | 91 | 1.08 |
| EXAMPLE 2-6 | 0.85 | 1.56 | 2.03 | 0.30 | 0.09 | – | 7.45 | 170 | 308 | 95 | 95 | 1.18 |
| EXAMPLE 2-7 | 0.65 | 1.61 | 2.05 | 0.45 | 0.12 | 0.15 | 7.56 | 186 | 312 | 78 | 90 | 1.25 |
| COMPARATIVE EXAMPLE 2-1 | 0.38 | 2.15 | 1.98 | 0.31 | 0.05 | – | 7.50 | 175 | 220 | 50 | 50 | 0.68 |
| COMPARATIVE EXAMPLE 2-2 | 0.66 | 2.00 | 0.80 | 0.22 | 0.08 | – | 7.41 | 171 | 259 | 75 | 80 | 0.85 |
| COMPARATIVE EXAMPLE 2-3 | 0.90 | 3.50 | 1.15 | 0.22 | 0.12 | – | 7.15 | 159 | 245 | 70 | 75 | 0.87 |
| REFERENCE EXAMPLE 1 | 0.55 | – | 1.98 | 0.26 | 0.09 | – | 7.85 | 207 | 275 | 0 | 0 | 1.00 |

FIG. 5

| | COMPOSITION (MASS %) | | | | | | | | | DENSITY (g/cm³) | YOUNG'S MODULUS (GPa) | HARDNESS (Hv10) | RATIO OF MARTENSITE AND BAINITE | | FATIGUE STRENGTH RATIO |
|---|---|---|---|---|---|---|---|---|---|---|---|---|---|---|---|
| | C | Mo | | | Cu | Mn | S | P | | | | | MATERIAL (%) | VOID SURFACE (%) | |
| | | A | B | A+B | | | | | | | | | | | |
| EXAMPLE 3-1 | 0.61 | 1.09 | 0.11 | 1.20 | 2.49 | 0.41 | 0.11 | — | 7.44 | 175 | 290 | 74 | 91 | 1.29 |
| EXAMPLE 3-2 | 0.60 | 1.05 | 0.15 | 1.20 | 2.50 | 0.40 | 0.10 | — | 7.45 | 176 | 289 | 75 | 90 | 1.31 |
| EXAMPLE 3-3 | 0.59 | 0.98 | 0.12 | 1.10 | 2.50 | 0.40 | 0.11 | — | 7.46 | 175 | 294 | 76 | 92 | 1.27 |
| EXAMPLE 3-4 | 0.60 | 1.28 | 0.12 | 1.40 | 2.51 | 0.41 | 0.10 | — | 7.44 | 176 | 292 | 76 | 90 | 1.36 |
| EXAMPLE 3-5 | 0.60 | 1.87 | 0.13 | 2.00 | 2.51 | 0.40 | 0.10 | — | 7.43 | 174 | 287 | 75 | 91 | 1.41 |
| EXAMPLE 3-6 | 0.59 | 2.68 | 0.12 | 2.80 | 2.50 | 0.40 | 0.11 | — | 7.42 | 175 | 291 | 74 | 92 | 1.34 |
| COMPARATIVE EXAMPLE 3-1 | 0.59 | 1.21 | 0.00 | 1.21 | 2.51 | 0.40 | 0.11 | — | 7.46 | 175 | 294 | 76 | 91 | 1.13 |
| COMPARATIVE EXAMPLE 3-2 | 0.60 | 1.12 | 0.08 | 1.20 | 2.51 | 0.41 | 0.11 | — | 7.45 | 175 | 292 | 76 | 92 | 1.21 |
| COMPARATIVE EXAMPLE 3-3 | 0.60 | 0.67 | 0.13 | 0.80 | 2.50 | 0.40 | 0.11 | — | 7.46 | 175 | 294 | 76 | 91 | 1.10 |
| COMPARATIVE EXAMPLE 3-4 | 0.60 | 3.07 | 0.13 | 3.20 | 2.49 | 0.41 | 0.11 | — | 7.20 | 158 | 245 | 76 | 92 | 0.93 |
| COMPARATIVE EXAMPLE 3-5 | 0.59 | 3.88 | 0.12 | 4.00 | 2.50 | 0.40 | 0.10 | — | 7.18 | 156 | 257 | 75 | 92 | 0.94 |

FIG. 6

| | LUBRICATING OIL | MOLDING TEMPERATURE (°C) | COMPACTING PRESSURE (MPa) | SINTERING TEMPERATURE (°C) | SINTERING PERIOD (MINUTE) | COOLING SPEED (°C/MINUTE) | DENSITY (g/cm³) | YOUNG'S MODULUS (GPa) | HARDNESS (Hv10) | RATIO OF MARTENSITE AND BAINITE MATERIAL (%) | RATIO OF MARTENSITE AND BAINITE VOID SURFACE (%) | FATIGUE STRENGTH RATIO | TOOL LIFETIME RATIO |
|---|---|---|---|---|---|---|---|---|---|---|---|---|---|
| EXAMPLE 4-1 | 0.1%LiSt | 130 | 1000 | 1110 | 15 | 40 | 7.46 | 173 | 270 | 70 | 90 | 1.13 | 1.03 |
| EXAMPLE 4-2 | 0.1%LiSt | 130 | 1100 | 1170 | 30 | 70 | 7.49 | 175 | 305 | 75 | 95 | 1.15 | 1.02 |
| EXAMPLE 4-3 | 0.1%LiSt | 130 | 1100 | 1150 | 20 | 80 | 7.50 | 175 | 325 | 85 | 83 | 1.25 | 1.10 |
| COMPARATIVE EXAMPLE 4-1 | 0.8%ZnSt | 25 | 800 | 1150 | 15 | 70 | 7.23 | 152 | 255 | 75 | 91 | 0.76 | 0.88 |
| COMPARATIVE EXAMPLE 4-2 | 0.8%ZnSt | 25 | 1100 | — | — | — | NO NORMAL COMPACT OBTAINED BY GALLING | | | | | | |
| COMPARATIVE EXAMPLE 4-3 | 0.0%LiSt | 130 | 1100 | 1150 | 5 | 50 | 7.45 | 177 | 260 | 62 | 90 | 0.82 | 0.92 |
| COMPARATIVE EXAMPLE 4-4 | 0.0%LiSt | 130 | 1100 | 1150 | 60 | 50 | 7.48 | 178 | 280 | 63 | 80 | 0.89 | 1.05 |
| COMPARATIVE EXAMPLE 4-5 | 0.1%LiSt | 130 | 1100 | 1250 | 10 | 40 | 7.46 | 181 | 285 | 85 | 85 | 0.85 | 0.88 |
| COMPARATIVE EXAMPLE 4-6 | 0.1%LiSt | 130 | 1100 | 1150 | 20 | 30 | 7.45 | 178 | 243 | 63 | 85 | 0.75 | 1.05 |
| COMPARATIVE EXAMPLE 4-7 | 0.1%LiSt | 130 | 1100 | 1150 | 20 | 150 | 7.48 | 179 | 392 | 100 | 100 | 1.34 | 0.55 |
| REFERENCE EXAMPLE 1 | — | — | — | — | — | — | 7.85 | 207 | 275 | 0 | 0 | 1.00 | 1.00 |

IRON-BASED SINTERED MATERIAL AND PRODUCTION METHOD THEREOF

BACKGROUND OF THE INVENTION

1. Field of the Invention

The present invention relates to an iron-based sintered material obtained by sintering an iron-based powder and a production method thereof, and in particular to an iron-based sintered material favorable for use as a member demanding fatigue strength and rigidity such as connection rod and a production method thereof.

2. Description of the Related Art

Connector ring rod (connection rod) for automobile engine is a member for connecting piston to crank shaft, and, as shown in FIG. 7, a connection rod 70 has an insertion hole 71 for insertion of a piston pin formed at one terminal and another insertion hole 72 for insertion of crank shaft pin at the other terminal.

Because of productivity and others, such a connection rod is often produced from an iron-based sintered material by powder metallurgy. Recently, there are demands for reduction in the weight and also in the thickness of the connection rod, in the trend toward further improvement in environmental resistance and performance of automobiles. However, reduction in thickness of the connection rod is occasionally accompanied by insufficient strength of the connection rod.

Under the circumstances above, for example, proposed as the material for connection rod is an iron-based sintered material in an iron-based metal structure containing nickel (Ni), copper (Cu), molybdenum (Mo), and carbon (C) in amounts in particular ranges and having a void rate of 2 to 8% in the metal structure (see Japanese Patent Application Laid-Open No. 2002-20847).

The iron-based sintered material described in Japanese Patent Application Laid-Open No. 2002-20847, which contains the elements at particular rates and is obtained by sintering the iron-based powder to make the iron-based powder have a particular void rate, has improved strength and toughness.

SUMMARY OF THE INVENTION

However, when an iron-based sintered material, such as that described in Japanese Patent Application Laid-Open No. 2002-20847, is used for a connection rod, the connection rod, which is exposed to the repetitive load and the impact load by engine operation, is rather vulnerable to cracking from the void surface in the metal structure. For example, when exposed to repetitive load, the void-surface structure receives metal fatigue, with the void functioning as a notch. And, the metal fatigue in turn may lead to progress of cracking from the voids in the iron-based sintered material, which function as initial points, and consequently to fatigue breakdown of the connection rod.

It is desirable to eliminate the initial points of breakdown, i.e., voids, in such a case, and thus, to raise the pressure applied during compression molding of the iron-based powder further, but it is still not possible to eliminate the voids in the metal structure completely by the method.

For improvement of the fatigue strength of iron-based sintered material and also for improvement of the mechanical strength of the iron-based sintered material, it may be possible to add reinforcing elements to the iron-based sintered material additionally or to convert the metal structure of the iron-based sintered material into martensite by adjustment of the cooling speed during sintering. However, such an increase in mechanical strength of the iron-based sintered material may possibly be accompanied by deterioration in the machinability of the iron-based sintered material.

Although the iron-based sintered material described in Japanese Patent Application Laid-Open No. 2002-20847 contains nickel, the iron-based powder above has austenite structures remaining after sintering, and thus, it is difficult to assume that a connection rod prepared with such an iron-based sintered material has sufficient strength.

An object of the present invention, which was made to solve the problems above, is to provide an iron-based sintered material resistant to the metal fatigue developing from the voids therein functioning as the initial points and improved in the strength and machinability thereof and a production method thereof.

After intensive studies to solve the problems above, the inventors have found that it is possible to control the kind and amount of the surface metal structure of the voids in an sintered material obtained by sintering the iron-based powder containing particular components under heat and pressure of a particular condition and to reduce the fatigue breakdown of the iron-based sintered material from the initial points of hollow voids without deterioration in the machinability of the iron-based sintered material by the control.

The iron-based sintered material according to the present invention, which solved the problems above, is an iron-based sintered material, including a mixed structure of martensite, bainite, and pearlite and multiple voids formed in the mixed structure, wherein the ratio of martensite and bainite in the mixed structure is 70% or more; the ratio of martensite and/or bainite in the mixed structure forming the void surface is 90% or more; and the density of the iron-based sintered material is 7.4 g/cm³ or more.

According to the present invention, it is possible to strengthen the area around the voids in the iron-based sintered material and thus, to reduce the fatigue breakdown from the initial points in the area surrounding the voids, by adjusting the ratios of martensite and bainite and the ratio of martensite and/or bainite in the structure forming the void surface in particular ranges. It is also possible to improve the machinability of the iron-based sintered material. It is also possible to improve the mechanical strength of the iron-based sintered material, by adjusting the density of the iron-based sintered material to be 7.4 g/cm³ or more.

In other words, when the ratios of martensite and bainite in the mixed structure of the metal structure are smaller than 70%, or when the ratio of martensite and/or bainite in the mixed structure forming the void surface is smaller than 90%, it is not possible to improve the fatigue strength of the iron-based sintered material sufficiently. The upper limit of the ratio of martensite and bainite in the mixed structure is smaller than 100%, considering that the metal structure still contains pearlite, and the upper limit of the ratio of martensite and/or bainite in the mixed structure forming the void surface is 100% or less, assuming that the void surfaces are formed all by martensite and/or bainite. Alternatively, the upper limit of the density of iron-based sintered material is less than 7.85 g/cm³, considering that it is a sintered material.

The iron-based sintered material according to the present invention more preferably has a Young's modulus of 160 GPa or more. According to the present invention, it is possible to obtain a member of the iron-based sintered material lighter and superior in rigidity, by using the sintered material having a Young's modulus in the range above. In particular, when a connection rod is produced with an iron-based sintered material having a Young's modulus of lower than 160 GPa, the connection rod is less rigid, causing greater deformation of its terminal and consequently leading, for example, to burn-in of the bearing connected to the connection rod terminal. The upper limit of the Young's modulus is 210 GPa or less, considering that it is the iron-based sintered material described above.

The iron-based sintered material according to the present invention more preferably contains at least, C: 0.4 to 1.0 mass %, Mo: 1.0 to 3.0 mass %, Cu: 1.0 to 4.0 mass %, Mn: 0.2 to 1.0 mass %, and S: 0.05 to 0.3 mass %.

Carbon (C) has an action to improve the hardness and strength of the material, but a content of less than 0.4 mass % leads to undesirable strength of the iron-based sintered material, while a content of more than 1.0 mass % leads to drastic deterioration in toughness of the iron-based sintered material and also makes it difficult to produce the iron-based sintered material, because of deterioration in compressibility of the iron powder during sintering.

Molybdenum (Mo), which strengthens iron structure by forming a solid solution with the base material iron, can improve the strength of the iron-based sintered material and also the iron quenching efficiency, and thus, improves the hardness of the iron-based sintered material after sintering. Even when alloyed with iron, molybdenum hardly reduces the compressibility of the iron powder to be sintered. However, a molybdenum content of less than 1.0 mass % leads to decrease in the heat treatment efficiency of the iron-based sintered material, while a content of more than 3.0 mass % to hardening of the iron powder to be sintered, making it difficult to produce the iron-based sintered material because of deterioration in the compressibility of the iron powder. The method of adding molybdenum to the iron-based sintered material is not particularly limited, and thus, molybdenum may be previously alloyed with iron powder to be sintered or bonded or deposited onto the surface of the iron powder.

Alternatively, copper (Cu) forms a liquid phase during sintering of iron powder, accelerating mutual sintering of the iron powder particles, making the voids formed in the iron-based sintered material more spherical, and improving the strength and hardness of the iron-based sintered material by forming a solid solution with the base material iron. It also strengthens the metal structure surrounding voids selectively and thus, improves the fatigue strength of the iron-based sintered material. However, a copper content of less than 1.0 mass % leads to insufficient improvement in strength of * the iron-based sintered material, while a content of more than 4 mass % to embrittlement of the iron-based sintered material. More preferably, the content of the copper is 1.5 mass % to 3.0 mass %. The method of adding copper to the iron-based sintered material is not particularly limited, if the content of copper in the iron-based sintered material is in the range above, and, for example, electrolytic copper powder or atomized copper powder may be added to iron-based powder and the mixture sintered, or alternatively, copper may be bonded or deposited on the surface of iron-based powder surface and the powder containing the iron-based powder sintered.

Similarly to molybdenum (Mo), manganese (Mn) strengthens iron by forming a solid solution with the base material iron and improves the strength of the iron-based sintered material. It also improves the quenching efficiency of iron significantly in the copresence with molybdenum, giving an iron-based sintered material superior in toughness. However, a manganese content of less than 0.2 mass % does not allow production of an iron-based sintered material superior in toughness, while a content of more than 1.0% leads to easier oxidation of the iron powder during sintering and deterioration in strength of the iron-based sintered material by oxidation.

Yet alternatively, sulfur (S) improves the machinability of the iron-based sintered material by forming a manganese sulfide (MnS) compound with manganese (Mn) in the iron-based sintered material. However, a sulfur content of less than 0.05 mass % leads to insufficient manganese sulfide compound content and thus deterioration in the machinability of the sintered material, while a content of more than 0.3 mass % to deterioration in the strength and hardness of the iron-based sintered material.

The iron-based sintered material according to the present invention preferably contains P additionally in an amount of 0.05 to 0.2 mass %. In the present invention, phosphorus (P) forms a liquid phase during sintering of iron powder, making the voids formed in the iron-based sintered material more spherical and reducing the size of the voids further. As a result, it improves the fatigue strength and toughness of the iron-based sintered material, giving a connection rod particularly favorable in the application for high-power connection rods demanding reduction in weight. However, a phosphorus content of less than 0.05 mass % does not allow sufficient improvement of the fatigue strength of the iron-based sintered material and others, while a content of more than 0.2 mass % leads to embrittlement of the iron-based sintered material.

The iron-based sintered material according to the present invention is a material obtained by sintering an alloy powder of a Fe—Mo—Mn alloy having Mo diffused and deposited on the surface, and the total amount of Mo in the alloy and Mo diff-used and deposited on the surface is in the range of 1.0 mass % to 3.0 mass % with respect to the total mass of the alloy powder, and the amount of Mo diffused and deposited on the surface is more preferably 0.1 mass % or more. The content of manganese in the alloy powder is more preferably more than 0 mass % and less than 0.25 mass %.

In the present invention, it is possible, by using an alloy powder in the configuration in the range above, to accelerate growth of necks (powder binding regions) during sintering, reduce the size of the voids formed in the iron-based sintered material, and accelerate conversion of the void surface structure further into martensite or bainite. Thus, when the surface deposition amount of molybdenum is less than 0.1 mass %, it is not possible to accelerate sintering of the iron-based sintered material sufficiently. The alloy powder may be previously alloyed by partial atomization of manganese. The phrase "diffused and deposited" as used in the present invention means a state where Mo is diffused from the powder surface to the powder surface layer and also a state where Mo is deposited on the powder surface.

The present invention also discloses a method of producing the iron-based sintered material. The iron-based sintered material according to the present invention is produced by a method of producing an iron-based sintered material by sintering a powder, at least including a step of preparing a mixture of a powder containing at least, C: 0.4 to 1.0 mass %, Mo: 1.0 to 3.0 mass %, Cu: 1.0 to 4.0 mass %, Mn: 0.2 to 1.0 mass %, and S: 0.05 to 0.3 mass % and a lubricant as the powder and as the component of the iron-based sintered, a step of forming a composite compact by filling the mixture in a forging die and pressurizing the mixture under the condition of an applied pressure of 1000 to 1500 MPa by warm die-wall lubrication method, a step of sintering the composite compact by heating the composite compact at a heating temperature in the range of 1110 to 1170° C. for 10 to 30 minutes, and a step of cooling the composite compact after sintering from the heating temperature to 550° C. at a cooling speed in the range of 40 to 100° C./minute.

According to the present invention, it is possible to obtain an iron-based sintered material having a metal structure of mixed structure of martensite, bainite, and pearlite, wherein the ratio of martensite and bainite is 70% or more, and the ratio of martensite and/or bainite in the mixed structure forming the void surface of the iron-based sintered material is 90% or more, by mixing a sintering powder material containing iron as the main component, sintering the powder under the heating condition described above, and cooling the powder under the cooling condition described above. It is preferably to use an iron-based alloy powder containing almost not components other than carbon or a carbon powder such as graphite powder as the powder, but a powder having a component other than carbon that is diff-used and deposited on the iron powder surface, or a mixture of a powder of a component other than carbon a carbon powder and an iron powder may be used instead of the iron-based alloy powder, and thus, the kind of the powder used is not particularly limited, if the iron-based sintered material is contained as the component.

When the heating temperature is lower than 1110° C., it is not possible to sinter the powder sufficiently and thus not possible to improve the quenching efficiency of the sintering material. It is not possible to improve the fatigue strength and machinability, when the heating temperature is higher than 1170° C., and it is not possible to improve one or both of the fatigue strength and machinability, when the heating period is shorter than 10 minutes or longer than 30 minutes. In addition, it is difficult to obtain the sintered compact in the mixed structure at the rate above and not possible to raise the fatigue strength, when the sintered compact is cooled at a cooling speed of less than 40° C./minute, and it is possible to raise the fatigue strength but only with deterioration in machinability because of increase in the rate of martensite in the mixed structure, when the cooling speed is more than 100° C./minute. It is further possible to pressurize the composite compact to an iron-based sintered material density of 7.4 g/cm or more even under the pressure condition above, by pressurizing the composite compact under the pressurization condition by warm die-wall lubrication method. It is also possible to process, for example form a screw hole in, the composite compact before sintering without breakdown of the compact, because the molded composite compact is higher in density than conventional composite compacts. As a result, it is possible to mass-produce members of the iron-based sintered material and thus, to reduce the processing cost.

It is also difficult to obtain the density when the pressurization force is lower than 1000 MPa, and it is also difficult to raise the density of the iron-based sintered material any more even when the pressurization force is higher than 1500 MPa.

Also as the powder in the method of producing an iron-based sintered material according to the present invention, it is preferable to use a powder containing P added to make the iron-based sintered material contain P: 0.05 to 0.2 mass %. Because the phosphorus forms a liquid phase during sintering of the iron powder and makes the voids formed in the iron-based sintered material more spherical, use of the powder is effective in making the voids finer. As a result, it is possible to improve the fatigue strength and the toughness of the iron-based sintered material.

Further, in the method of producing an iron-based sintered material according to the present invention, the powder used is more preferably an iron-based sintered material of Fe—Mo—Mn alloy having Mo diffuse-deposited on the surface, wherein the total amount of Mo in the alloy and Mo diffused and deposited on the surface is in the range of 1.0 to 3.0 mass % with respect to the alloy powder and the amount of the Mo diffused and deposited on the surface is 0.1 mass % or more. Further, the content of manganese in the alloy powder is more preferably more than 0 mass % and less than 0.25 mass %.

Further, the method of producing an iron-based sintered material according to the present invention preferably has an additional step of subjecting the sintered material obtained by cooling the composite compact in the cooling step to a shot peening treatment. The shot peening treatment provides the sintered material surface with residual compression stress and improves the fatigue strength of the iron-based sintered material further.

The iron-based sintered material according to the present invention and the iron-based sintered material produced by the production method according to the present invention are resistant to damages originating the voids in the sintered material and have improved material strength. In addition, the machinability of the iron-based sintered material is also improved, leading to improvement of the productivity for the iron-based sintered material.

BRIEF DESCRIPTION OF THE DRAWINGS

FIG. 3 is a table showing the results in the Evaluation results of Examples 1-1 to 1-4 and Comparative Examples 1-1 to 1-7;

FIG. 4 is a table showing the composition and Evaluation results of the iron-based sintered materials in Examples 2-1 to 2-7 and Comparative Example 2-1 to 2-3;

FIG. 5 is a table showing the composition and Evaluation results of the iron-based sintered materials in Examples 3-1 to 3-6 and Comparative Example 3-1 to 3-5;

FIG. 6 is a table showing the molding and sintering conditions and the Evaluation results of the iron-based sintered materials in Examples 4-1 to 4-3 and Comparative Examples 4-1 to 4-7.

DESCRIPTION OF THE PREFERRED EMBODIMENTS

Hereinafter, favorable embodiments of the present invention will be described with reference to Examples. In the following Examples, connection rods for automobile engine were prepared as the iron-based sintered materials according to the present invention.

EXAMPLE 1-1

<Preparation of Connection Rod>

Figure 7:
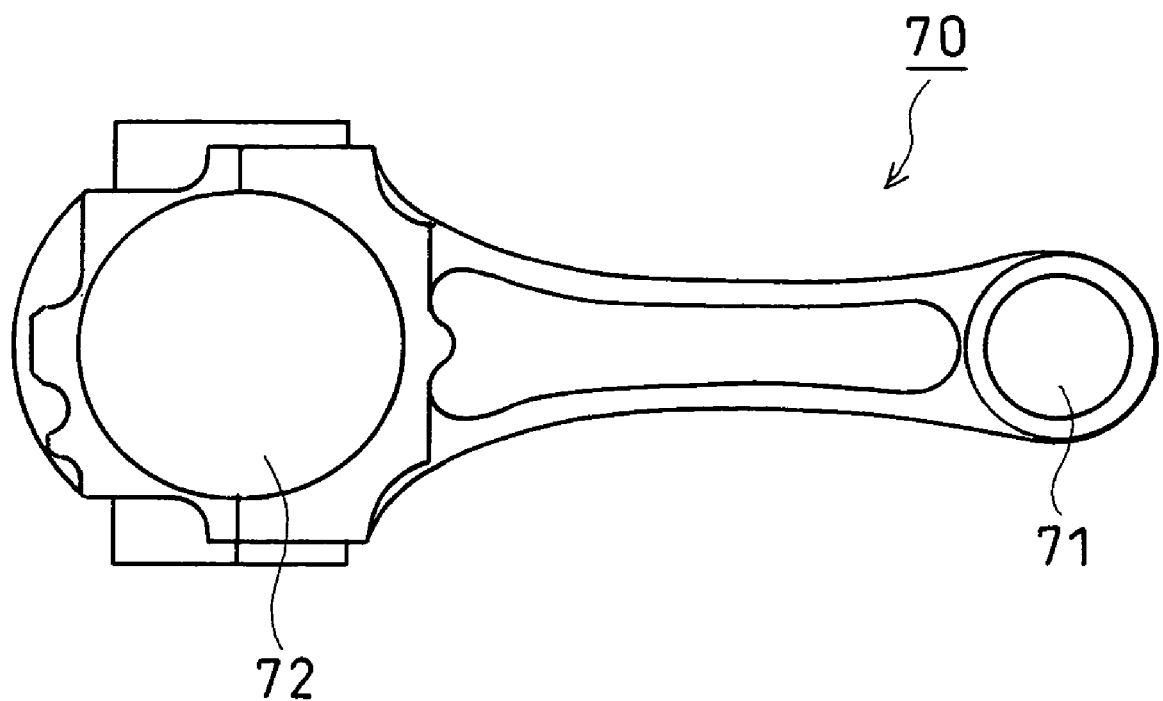
FIG. 7 is a view illustrating a connection rod for automobile.

A Fe powder, a Fe—Mo alloy powder, a Fe—Mn powder, a Fe—P alloy powder, a MnS powder, a Cu powder, and a graphite powder respectively having average particle diameters in the range of 5 to 150 μm were made available as raw powders, and these powders were blended to give an iron-based sintering material in the composition during sintering of C: 0.4 to 1.0 mass %, Mo: 1.0 to 3.0 mass %, Cu: 1.0 to 4.0 mass %, Mn: 0.2 to 1.0%, S: 0.05 to 0.3 mass %, P: 0.05 to 0.2 mass %. Then, Li stearate was added as a lubricant in an amount of 0.1 mass %, and the mixture was blended in a V mixer for 30 minutes, to give a mixture. Then, a composite compact was prepared by press molding by the warm die-wall lubrication method of heating a forging die for connection rod to 130° C., spray-coating an aqueous Li stearate dispersion on the forging die wall as a lubricant, filling the mixture in the forging die, and applying a pressure of 1000 MPa to 1500 MPa. The molded composite compact was placed in a mesh-belt sintering furnace and sintered into the composite compact, while heated therein in a heating temperature range of 1110 to 1170° C. under a nitrogen gas atmosphere containing 5 vol % hydrogen for 30 minutes. The composite compact still in the heated condition after sintering was cooled to 550° C. at a cooling rate in the range of 40 to 100° C./minute, and then, the surface was subjected to shot peening treatment, to give a connection rod, in the shape shown in FIG. 7, having an entire length of 204 mm, a piston-insertion-hole outside width of 32 mm, a thickness of 21 mm, crank-pin-insertion-hole outside width of 82 mm, and a thickness of 21 mm.

<Measurement of Physical Properties>

The density of the connection rod was calculated from the volume as determined by Archimedes's method and the weight separately determined, and the Young's modulus thereof was determined by a ultrasonic test method. Separately, the surface hardness was determined by using a Vickers hardness meter. The results are summarized in the table of FIG. 3.

<Fatigue Strength Test>

The holders for piston pin and crank pin were inserted respectively into the piston insertion hole and the crank pin insertion hole of the connection rod, and the composite was placed in a hydraulic-pressure servo test machine for fatigue test. Separately, a connection rod of Fe-2% Cu-0.6% C having a density of 7.85 g/cm$^3$ in the same shape was prepared under the same condition for the fatigue test, by a conventional sintering forging method, as shown in the Reference Example 1 in the table of FIG. 3. The ratio of the fatigue strength obtained in Example 1 to that obtained in Reference Example 1 (fatigue strength ratio) was calculated. The results are summarized in the table of FIG. 3.

<Structural Observation: Ratio of Martensite and Bainite>

Figure 1:
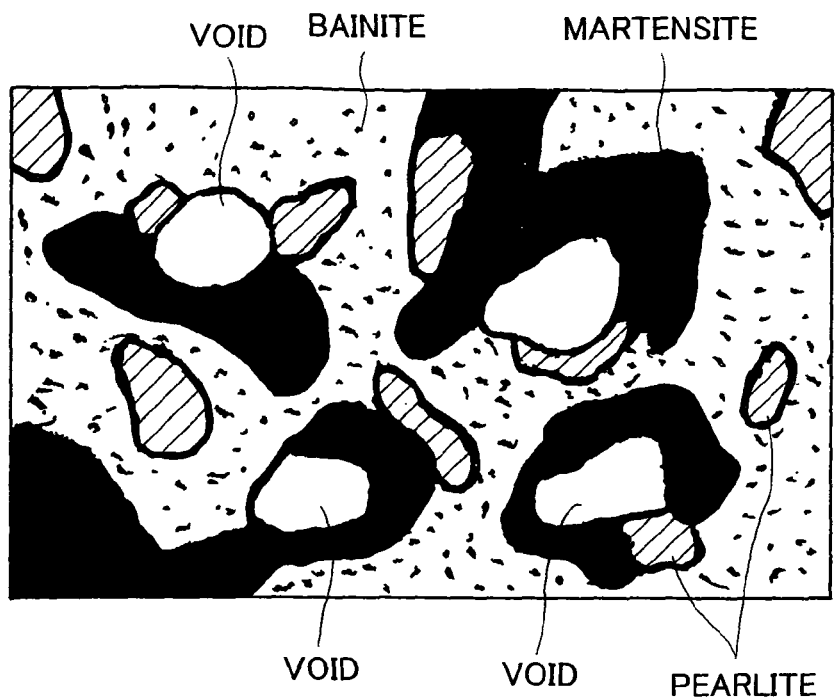
FIG. 1 is a view showing the method of measuring the ratio of the mixed structure consisting of martensite, bainite, and pearlite in an iron-based sintered material.

The connection rod prepared was cut into pieces; the cross section of the piece was polished; the polished face was etched with nital etching solution; and the structure of the etched face was observed under a microscope. As shown in FIG. 1, the iron-based sintered material has a metal structure and voids, and the metal structure is a mixed structure of martensite, bainite, and pearlite, and the ratio of martensite and bainite in the mixed structure was determined. The results are summarized in the table of FIG. 3. As shown in FIG. 1, the ratio of martensite and bainite in the mixed structure was calculated from the area of the martensite/bainite metal structure in the entire image area by image analysis of an image observed under microscope.

Figure 2:
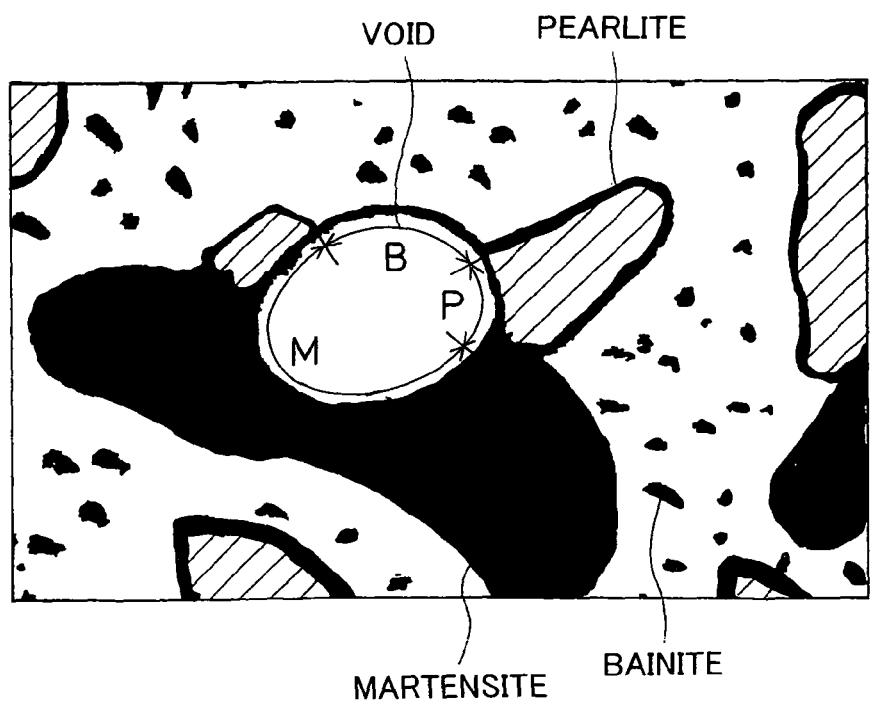
FIG. 2 is a view showing the method of measuring the ratio of metal structures forming the void surface.

The ratio of martensite and/or bainite in the mixed structure forming the void surface, i.e., the ratio of martensite and bainite (one of them, if there is only one of them) in the void surface, was determined. Specifically as shown in FIG. 2, it is calculated from the rate of the peripheral length of the martensite and bainite in contact with a void to the entire peripheral length of the void (M corresponds to martensite and B to bainite, and the peripheral length of martensite and bainite is the sum of the lengths M and B) that is obtained by image analysis of the image observed under microscope. When the mixed structure forming the void surface contains only martensite or bainite, the ratio of the peripheral length of martensite or bainite to the entire length of the void is calculated.

EXAMPLES 1-2 TO 1-4

Connection rods were prepared in a similar manner to Example 1-1. Examples 1-2 to 1-4 were different from Example 1-1 in that the cooling speed after sintering was modified. Specifically, the cooling speeds in Example 1-2 to 1-4 were respectively 50, 60, and 70° C./minute. Similarly to Example 1-1, measurement of physical properties, fatigue test, and microscopic observation were carried out in Examples 1-2 to 1-4. The results are summarized in the table of FIG. 3.

COMPARATIVE EXAMPLES 1-1 TO 1-7

Comparative Examples 1-1 and 1-2 were different from Example 1-1, in that the pressure during molding was adjusted to be 1000 MPa or less (specifically 600 MPa) to make the density of the connection rod lower than 7.4 g/cm$^3$, and Comparative Example 1-2 in that the Mo content in the connection rod was lowered to 0.8 mass %.

Comparative Examples 1-3 to 1-7 were different from Example 1-1, in that the connection rod was produced in such a manner that the ratio of martensite and bainite in the mixed structure after sintering was lower than 70%, and/or the ratio of martensite and/or bainite in the mixed structure forming the void surface is lower than 90%.

Comparative Example 1-3 is different from Example 1-1 in that the cooling speed of the composite compact after sintering was 30° C./minute or less (specifically 30° C./minute) until the temperature reached 550° C.

Comparative Example 1-4 was different from Example 1-1 in that the Mo content in the connection rod was lowered (specifically to 0.7 mass %).

Comparative Example 1-5 was different from Example 1-1 in that the Mo content in the connection rod was lowered (specifically to 0.8 mass %) and the compacting pressure and the cooling speed were also modified (specifically, to 1000 MPa and 30° C./minute).

Comparative Example 1-6 was different from Example 1-1 in that the Cu content in the connection rod was lowered and the Mo content in the connection rod raised.

Comparative Example 1-7 was different from Example 1-1 in that the Cu content in the connection rod was lowered and the cooling speed was also modified. Similarly to Example 1-1, measurement of physical properties, fatigue test, and microscopic observation were carried out in Comparative Examples 1-1 to 1-7. The results are summarized in the table of FIG. 3.

(Result 1)

As summarized in the table of FIG. 3, the connection rods obtained in Examples 1-1 to 1-4 had a fatigue strength ratio of 1.00 or more, while those obtained in Comparative Example 1-1 to 1-7 had a fatigue strength ratio of less than 1.0.

(Discussion 1)

The result 1 suggests that the connection rod has an improved fatigue strength when all of the conditions (1) to (3): (1) the ratio of martensite and bainite in the mixed structure is 70% or more; (2) the ratio of martensite and/or bainite in the mixed structure forming the void surface is 90% or more; and (3) the density of the connection rod (iron-based sintered material) is 7.4 g/cm$^3$ or more are satisfied. The Young's modulus of the connection rod is dependent on the density, and thus, the Young's modulus of the connection rod satisfying the condition above is considered to be 160 GPa or more from the table in FIG. 3.

EXAMPLES 2-1 TO 2-7

Connection rods were prepared in a similar manner to Example 1-1. The Examples were different from Example 1-1, in that powders were chosen from the powders used in Example 1-1 and mixed with each other in the composition summarized in the table of FIG. 4. Similarly to Example 1-1, measurement of physical properties, fatigue test, and microscopic observation were carried out in Comparative Examples 2-1 to 2-7. The results are summarized in the table of FIG. 4. The composition, the physical properties determined, and the results of fatigue test and microscopic observation of the connection rod prepared by sintering forging in Reference Example 1 are also shown additionally.

COMPARATIVE EXAMPLES 2-1 TO 2-3

Connection rods were prepared in a similar manner to Example 2-1. The Comparative Examples were different from Example 2-1 in that the powders were mixed in the composition summarized in the table of FIG. 4. Comparative Example 2-1 was different from Example 2-1 in that the pressure applied to the composite compact during molding was lowered to 1000 MPa and the cooling speed modified to 30° C./minute, while Comparative Examples 2-2 and 2-3 in that the cooling speeds were changed respectively to 500° C./minute and 40° C./minute.
(Result 2)

As summarized in the table of FIG. 4, the connection rods obtained in Examples 2-1 to 2-7 had a fatigue strength ratio of 1.00 or more, while those obtained in Comparative Examples 2-1 to 2-3 a fatigue strength ratio of less than 1.00.
(Discussion 2)

The result 2 suggests that the connection rod has an improved fatigue strength when all of the conditions (1) to (3): (1) the ratio of martensite and bainite in the mixed structure is 70% or more; (2) the ratio of martensite and/or bainite in the mixed structure forming the void surface is 90% or more; and (3) the density of the connection rod (iron-based sintered material) is 7.4 g/cm$^3$ or more are satisfied, and the connection rods of iron-based sintered material in a composition of C: 0.4 to 1.0 mass %, Mo: 1.0 to 3.0mass %, Cu: 1.0 to 4.0 mass %, Mn: 0.2 to 1.0 mass %, and S: 0.05 to 0.3 mass % such as those in Examples 2-1 to 2-7 are more likely to satisfy the requirements (1) to (3). In addition, the connection rod of the iron-based sintered material containing phosphorus additionally in the composition, such as that in Example 2-7, seems to have improved fatigue strength. Phosphorus, which forms a liquid phase during sintering of the iron powder, is considered to make the voids formed in the iron-based sintered material more spherical and reduce the size of the voids, and it is not possible to improve the fatigue strength of the iron-based sintered material or the like sufficiently when its content is less than 0.05 mass %, and addition thereof to a content of more than 0.2 mass % leads to embrittlement of the iron-based sintered material.

EXAMPLES 3-1 TO 3-6

Connections rods were prepared in a similar manner to Example 1-1. The Examples were different from Example 1-1 in that a Fe—Mo—Mn powder, a Cu powder, a MnS powder, and a graphite powder were mixed in preparation of the powder in the composition summarized in the table of FIG. 5, and the pressure during pressured molding was 1000 MPa, the heating temperature (sintering temperature) during sintering heating was 1150° C. and the heating time (sintering period ) condition to 20 minutes, and the cooling speed after then to 70° C./minutes. As summarized in the table of FIG. 5, the Fe—Mo—Mn alloy powder used was a Fe-A % Mo-0.2% Mn atomization alloyed powder (atomization alloyed powder A mass % of Mo and 0.2 mass % of Mn) carrying B mass % of Mo powder diffuse-deposited on the surface. Also used was a powder having a total amount of Mo in the Fe—Mo—Mn alloy powder and Mo diffuse-deposited on the surface (Mo (A+B) shown in FIG. 5) in the range of 1 mass % to 3 mass % with respect to the alloy powder and also having a Mo amount diffuse-deposited on the surface (Mo (B) shown in FIG. 5) at 0.1 mass % or more.

COMPARATIVE EXAMPLES 3-1 TO 3-5

Connection rods were prepared in a similar manner to Example 3-1. The Comparative Examples were different from Example 1-1 in that, as shown in FIG. 5, a powder having a total amount of Mo in the Fe—Mo—Mn alloy powder and Mo diffuse-deposited on the surface (Mo (A+B) shown in FIG. 5) in the range of 1 mass % to 3 mass % with respect to the alloy powder and also having an amount of Mo diffuse-deposited on the surface (Mo (B) in FIG. 5) at less than 0.1 mass % was used.
(Result 3)

The fatigue strengths of the samples obtained in Examples 3-1 to 3-6 were higher than those in Comparative Examples 3-1 to 3-5. The densities of the sample in Comparative Example 3-4 or 3-5 were lower than those of the other samples.
(Discussion 3)

The result 3 shows that the Fe—Mo—Mn alloy powder hardens significantly in the connection rods having a total Mo amount of more than 3 mass % as in Comparative Examples 3-4 and 3-5, prohibiting increase in density of the iron-based sintered material of connection rod and leading to deterioration in fatigue strength. As shown in Comparative Example 3-3, when the total Mo amount is less than 1 mass %, the iron-based sintered material contains Mo, thus allowing only modest, not drastic, increase in fatigue strength. As shown in Examples 3-1 to 3-6, an amount of the diffuse-deposited Mo at 0.1 mass % or more leads to improvement in fatigue strength and an amount of 0.5 mass % or more does not allow further increase in fatigue strength, and thus, considering the powder production cost, the amount of Mo diffuse-deposited on the surface would be desirably 0.5 mass % or less.

EXAMPLE 4-1

A connection rod was prepared in a similar manner to Example 3-1. The Example were different from Example 3-1 in that the powders were mixed to give a mixture in the composition of Mo: 2.0 mass %, Cu: 2.5 mass %, Mn: 0.3 mass %, S: 0.12 mass %, and C: 0.7 mass %, the pressure applied during molding of the composite compact was 1100 MPa, the heating temperature (sintering temperature) during sintering heating was 1100° C. and the heating time (sintering period), 15 minutes, and the cooling speed after then, 40° C./minutes. Measurement of physical properties, microscopic observation, and fatigue test were carried out, in a similar manner to Example 3-1. The internal region at the terminal of connection rod was machined with a tool, for evaluation of its machinability. The sinter forged material in Reference Example 1 described above was also evaluated similarly, and the ratio of the tool lifetime in Example 4-1 to that in Reference Example 1 was calculated. These results are summarized in the table of FIG. 6.

EXAMPLES 4-2 AND 4-3

Connection rods were prepared in a similar manner to Example 4-1. The Examples were different from Example 4-1 in that, as shown in FIG. 6, the sintering temperature in Example 4-2 or 4-3 was raised to 1170° C. or 1150° C., the sintering period in the temperature condition was 30 minute or 20 minute, and the cooling speed after sintering was 70° C./minute or 80° C./minute. These connection rods were subjected to Evaluation tests, similar to those in Example 4-1. The results are summarized in the table of FIG. 6.

COMPARATIVE EXAMPLES 4-1 AND 4-2

Connection rods were prepared in a similar manner to Example 4-1. The Examples were different from Example 4-1 in that pressure compacting was not performed by warm die-wall lubrication method in Comparative Examples 4-1 and 4-2, specifically, in that, as shown in FIG. 6, a lubricant containing 0.8 mass % added zinc stearate was used as the lubricant added to the powder mixture and coated on the forging die for pressure compacting, the mold temperature during molding of the composite compact was 25° C., and the pressure applied during molding of the composite compact was 1100 MPa or 800 MPa. In addition, the Comparative Example 4-1 is also different in that the cooling speed after sintering was 40° C./minute. Then, evaluation tests similar to those in Example 4-1 were conducted. The results are summarized in the table of FIG. 6.

COMPARATIVE EXAMPLES 4-3 AND 4-4

Connection rods were prepared in a similar manner to Example 4-1. The Examples were different from Example 4-1 in that no lubricant lithium stearate was added and the sintering periods were respectively 5 minutes and 60 minutes. Evaluation tests similar to those in Example 4-1 were conducted. The results are summarized in the table of FIG. 6.

COMPARATIVE EXAMPLE 4-5

A connection rod was prepared in a similar manner to Example 4-1. The Example was different from Example 4-1 in that the sintering temperature was 1250° C. and the sintering period in the temperature condition was 10 minutes. Evaluation tests similar to those in Example 4-1 were conducted. The results are summarized in the table of FIG. 6.

COMPARATIVE EXAMPLES 4-6 AND 4-7

Connection rods were prepared in a similar manner to Example 4-3. The Comparative Examples were different from Example 4-1 in that the cooling speeds after sintering were respectively 30° C./minute and 150° C./minute. Evaluation tests similar to those in Example 4-3 were conducted. The results are summarized in the table of FIG. 6.

(Result 4-1)
The density of the connection rod obtained in Comparative Example 4-1 has a density of 7.23 g/cm³, which was lower than those in Examples 4-1 to 4-3, and also had a lower fatigue strength ratio and a lower tool lifetime ratio. In Comparative Example 4-2, there was galling observed when the composite compact was separated from the forging die after pressure compacting, prohibiting production of normal composite compact.

(Result 4-2)
The samples obtained in Example 4-1 to 4-3 were higher in fatigue strength ratio than those obtained in Comparative Examples 4-3 and 4-4.

(Result 4-3)
The samples obtained in Examples 4-1 to 4-3 were higher in fatigue strength ratio and tool lifetime ratio than those obtained in Comparative Example 4-5.

(Result 4-4)
The sample obtained in Comparative Example 4-6 was lower in fatigue strength ratio at 1.0 or less than that in Example 4-3, while the sample obtained in Comparative Example 4-7 was higher in fatigue strength ratio but extremely lower in tool lifetime rate at about 0.5 than the sample in Example 4-3.

(Discussion 4-1)
The result 4-1 suggests that, as in Examples 4-1 to 4-3, it is possible to raise the pressure applied during molding (compacting pressure) without galling of the forging die by composite compact by using the warm die-wall lubrication method and thus, to obtain a sintered material having a high density (7.4 g/cm³ or more).

(Discussion 4-2)
The result 4-2 suggests that there is an optimal period of sintering the composite compact for improvement in fatigue strength ratio and tool lifetime ratio, and that the optimal sintering period is 10 to 30 minutes.

(Discussion 4-3)
The result 4-3 suggests that, considering the sintering efficiency of the composite compact and the sintering temperature condition in Example 4-1, the heating temperature (sintering temperature) is preferably 1100° C. or higher. A sintering temperature of as high as 1250° C., as in Comparative Example 4-5, results in deterioration in fatigue strength ratio and tool lifetime ratio, and thus, the sintering temperature is preferably 1170° C. or lower, based on the sintering temperature condition in Example 4-3. Therefore, the sintering temperature is preferably 1100° C to 1170° C.

(Discussion 4-4)
The result 4-4 suggests that there is an optimal cooling speed for cooling the composite compact after sintering (sintered material) for improvement in fatigue strength ratio and tool lifetime ratio and that it is preferably 40 to 100° C./minute. Thus as shown in Comparative Example 4-6, smaller cooling speed leads to decrease of the ratio of martensite and bainite and also to decrease in the hardness and the fatigue strength of the connection rod. Also as shown in Comparative Example 4-7, high cooling speed apparently leads to increase of the ratio of martensite and deterioration in machinability and the tool lifetime ratio.

What is claimed is:
1. An iron-based sintered material, comprising:
   a mixed structure of martensite, bainite, and pearlite and multiple voids formed in the mixed structure, wherein
   in a cross-section of the mixed structure, an area percentage ratio of martensite and bainite to the cross-section of the mixed structure is 70% or more and less than 100%;
   in the cross-section of the mixed structure, martensite and/or bainite define 90% or more of a perimeter of a void; and
   the density of said iron-based sintered material is 7.4 g/cm³ or more.

2. The iron-based sintered material according to claim 1, wherein the Young's modulus of said iron-based sintered material is 160 GPa or more.

3. The iron-based sintered material according to claim 2, wherein said iron-based sintered material contains at least C: 0.4 to 1.0 mass %, Mo: 1.0 to 3.0 mass %, Cu: 1.0 to 4.0 mass %, Mn: 0.2 to 1.0 mass %, and S: 0.05 to 0.3 mass %.

4. The iron-based sintered material according to claim 3, wherein said iron-based sintered material further comprises P: 0.05 to 0.2 mass %.

5. The iron-based sintered material according to claim 3 or 4, wherein said iron-based sintered material is a material obtained by sintering an alloy powder of a Fe—Mo—Mn alloy having Mo diffused and deposited on the surface, the total amount of Mo in said alloy and Mo diffused and deposited on said surface is in the range of 1 to 3 mass % with respect to the alloy powder, and the amount of the Mo diffused and deposited on said surface is 0.1 mass % or more.

* * * * *